(12) United States Patent
Tamaoka

(10) Patent No.: US 7,021,829 B2
(45) Date of Patent: Apr. 4, 2006

(54) FLUID-DYNAMIC-PRESSURE BEARING, SPINDLE MOTOR FURNISHED WITH THE FLUID-DYNAMIC-PRESSURE BEARING, METHOD OF MANUFACTURING ROTOR ASSEMBLY APPLIED IN THE SPINDLE MOTOR, AND RECORDING-DISK DRIVE FURNISHED WITH THE SPINDLE MOTOR

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 36 days.

(21) Appl. No.: 10/710,583

(22) Filed: Jul. 22, 2004

(65) Prior Publication Data

US 2005/0025405 A1   Feb. 3, 2005

(30) Foreign Application Priority Data

Jul. 22, 2003   (JP) ............................. 2003-277830

(51) Int. Cl.
   *F16C 17/10* (2006.01)

(52) U.S. Cl. ..................... 384/112; 384/107; 29/898.02

(58) Field of Classification Search ................ 384/107, 384/112, 113, 123; 29/898.02
See application file for complete search history.

(56) References Cited

U.S. PATENT DOCUMENTS

| | | | |
|---|---|---|---|
| 5,559,382 A | 9/1996 | Oku et al. | |
| 5,659,445 A | 8/1997 | Yoshida et al. | 360/98.07 |
| 6,375,357 B1 | 4/2002 | Miura et al. | |
| 6,456,458 B1 | 9/2002 | Ichiyama | |
| 2002/0053846 A1 | 5/2002 | Le et al. | |
| 2003/0231813 A1 | 12/2003 | Gomyo et al. | 384/107 |
| 2004/0091187 A1 | 5/2004 | Aiello et al. | |

FOREIGN PATENT DOCUMENTS

| | | |
|---|---|---|
| JP | 2857304 B2 | 11/1998 |
| JP | 2002-021845 A | 1/2002 |
| JP | 2003-092867 A | 3/2003 |
| JP | 2003-262217 A | 9/2003 |

*Primary Examiner*—Lenard A. Footland
(74) *Attorney, Agent, or Firm*—James Judge

(57) ABSTRACT

Fluid-dynamic-pressure bearing furnished with a shaft, a top plate fixed to an upper portion of the shaft, a thrust plate fixed to a lower portion of the shaft, a sleeve, and a cuplike bearing housing that along its inner periphery retains the sleeve. A lubricating-fluid-filled continuous micro-gap is formed in between the shaft and the sleeve and the top plate and the sleeve. Radial bearing sections are formed in between the shaft cylindrical outer surface and the sleeve cylindrical inner surface. An upper thrust bearing section is formed in between the undersurface of the top plate and the top-edge face of the bearing housing. A lower thrust bearing section formed in between the bottom margin of the sleeve and the top margin of the thrust plate. The bearing sections are each provided with dynamic-pressure-generating grooves for inducing dynamic pressure in the lubricating fluid when the shaft or sleeve spins.

33 Claims, 6 Drawing Sheets

FLUID-DYNAMIC-PRESSURE BEARING, SPINDLE MOTOR FURNISHED WITH THE FLUID-DYNAMIC-PRESSURE BEARING, METHOD OF MANUFACTURING ROTOR ASSEMBLY APPLIED IN THE SPINDLE MOTOR, AND RECORDING-DISK DRIVE FURNISHED WITH THE SPINDLE MOTOR

BACKGROUND OF INVENTION

1. Technical Field

The present invention relates to fluid-dynamic-pressure bearings and spindle motors furnished with the fluid-dynamic-pressure bearings, to methods of manufacturing rotor assemblies applied in the spindle motors, and to recording-disk drives furnished with the spindle motors.

2. Background Art

As bearings for motors that drive recording disks in hard disk drives, removable disk drives and similar devices, to date fluid-dynamic-pressure bearings have been employed and a variety have been proposed. Fluid-dynamic-pressure bearings exploit dynamic pressure generated, when the motor spins, in a lubricating fluid such as oil retained in a gap in between, as for example shown in FIG. 6, a shaft 102 and a sleeve 104.

In a conventional motor such as is depicted in FIG. 6, a pair of radial bearing sections 106 provided at an axial separation is formed in the gap in between the cylindrical outer surface of the shaft 102 and the cylindrical inner surface of the sleeve 104, and top and bottom thrust bearing sections 112 and 113 are formed in respective gaps between upper and lower faces of the rim of a thrust plate 108 fixed unitarily onto the shaft 102 and, opposing these faces, a lower surface of the sleeve 104 and an upper surface of a counterplate 110.

A further feature involving the cylindrical inner surface of the sleeve 104 and the cylindrical outer surface of the shaft 102 in this conventional motor is a capillary seal 118 formed in the interval between the radial bearing sections 106 and the snugged-fit section 116 between the shaft 102 and a rotor hub 114 fixed to the upper portion of the shaft 102. The cylindrical outer surface of the shaft 102 is constricted gradually, parting away from the radial bearings 106 as a pair, to form the capillary seal 118. Depending on the position where the gas-fluid interface forms in the oil retained within the capillary seal 118, a differential in capillary force will be produced in the capillary seal 118; and if the amount of oil that is retained by the radial bearing sections 106 and the top and bottom thrust bearing sections 112, 113 has decreased, oil is supplied from the capillary seal 118 to the radial bearing sections 106 and the top and bottom thrust bearing sections 112, 113. Likewise, if the volume of oil retained within the radial bearing sections 106 and the top and bottom thrust bearing sections 112, 113 has increased due to spindle-motor temperature elevation accompanying motor rotation, then that increase is accommodated.

In this way oil is continuously, without interruption retained in the micro-gap that forms the radial bearing sections 106, the top and bottom thrust bearing sections 112 and 113, and the capillary seal 118. (Such an oil-retention structure will be denoted a "full-fill structure" hereinafter.) When the motor spins, in the radial bearing sections 106 and the top and bottom thrust bearing sections 112, 113 dynamic pressure is generated, through which the sleeve 104 supports the shaft 102 and the rotor hub 114 in a non-contact bearing that lets them spin.

In recent years recording-disk drives that had been employed in personal computers and like devices have begun to be applied in information terminals further scaled-down for carrying along on the go, which has led to the desire for the spindle motors to be further downsized, slimmer profile, and lower power consuming, in addition to the high-speed and high-precision rotation traditionally expected from the spindle motors.

Nevertheless, if the spindle motor is to be made smaller-sized and vertically slimmer, the fact that the construction described above configures the snugged-fit section 116, the capillary seal 118, and the pair of radial bearing sections 106 and the top and bottom thrust bearing sections 112, 113 ranged in a line axially is prohibitive of scaling down and slimming down the spindle motor.

Put differently, against demands for miniaturized, slimmer spindle motors, maintaining the axial span necessary between the pair of radial bearing sections 106 to ensure sufficient bearing stiffness would stand in the way of maintaining the axial dimension that the snugged-fit section 116 and the top and bottom thrust bearing sections 112, 113 require. Shortening the axial dimension of the snugged-fit section 116 would weaken the clamping strength between the shaft 102 and the rotor hub 114, which would lead to the rotor hub 114 losing levelness when the motor is spinning, with the rotor hub 114 wobbling such that stabilized rotation could never be gained.

On the other hand, attempting to maintain the axial dimension that the snugged-fit section 116 requires would shorten the axial dimension of the pair of radial bearing sections 106, which would weaken the radial bearing stiffness such that the bearings could not stably support the shaft 102. The fact that maintaining the rotational precision and the attitude of the shaft 102 and rotor hub 114 depends exclusively on the pair of radial bearing sections 106 requires that sufficient axial span between the pair of radial bearing sections 106 be available. Consequently, scaling down and reducing the profile of a spindle motor as described earlier while sustaining the rotational precision called for in the motor proves to be extraordinarily challenging.

What is more, attempting to maintain the axial dimension that the pair of radial bearing sections 106 as well as the snugged-fit section 116 require is prohibitive of ensuring requisite bearing stiffness in the top and bottom thrust bearing sections 112, 113. In the conventional motor under discussion, the thrust plate 108 is fixed unitarily to the end portion of the shaft 102, wherein the axially directed load-bearing force generated by the top and bottom thrust bearing sections 112, 113 formed on the upper and lower faces of the rim of the thrust plate 108 governs the axial travel of the shaft 102 and rotor hub 114, stabilizing the lift on the shaft 102 and rotor hub 114.

Given the circumstances, then, making the axial dimension of the thrust plate 108 thinner in an attempt to trim the axial extent of the top and bottom thrust bearing sections 112, 113 would preclude attaining stabilized, axially directed load-bearing force in the thrust bearing sections 112, 113, compromising the bearing stiffness in those bearing sections. Such problems as over-lift on the shaft 102 and rotor hub 114 would occur as a consequence, which would be prohibitive of stably supporting the shaft 102 and rotor hub 114.

Another application of recording-disk drives that has begun of late is the installation of the drives in vehicle on-board devices, typified by car navigation systems. Yet in implementations in vehicle on-board devices, since the recording-disk drives are expected to perform under various environments, stable operation within an extremely broad temperature range is being demanded of the recording-disk drives. Use under severe temperature environments that recording-disk drives have not met with until now—for example, use under environments where changes in temperature that range across 100° C. or more are a possibility—is being called for.

The fact that, as is well known, the viscosity of oil drops under high-temperature environments means that the dynamic pressure generated by oil-filled dynamic-pressure bearings in such environments also falls, which consequently is prohibitive of attaining predetermined bearing stiffness. Employing a highly viscous oil in order to avert such degradation in oil viscosity means that the oil will be excessively viscous under low-temperature environments, increasing the rotational load on the motor, such that ultimately the amount of power that the motor consumes will grow. Consequently, in order to make broad-temperature-ranging application of a motor using a fluid-dynamic-pressure bearing possible, problems that run counter to each other—under low-temperature environments restraining increase in power consumption by the motor, while under high-temperature environments preventing degradation in bearing stiffness—must be resolved at once. Moreover, under high-temperature environments, along with the oil viscosity becoming less viscous, the volume of the oil increases due to thermal expansion. As a consequence, of the oil retained in the fluid-dynamic-pressure bearing sections, that portion by which the oil has volumetrically increased is forced out from the bearing sections into the capillary seal 118. Under those circumstances, if owing to the dimensional constraints of miniaturizing and slimming down the motor, the axial dimension of the capillary seal 118 is limited such that sufficient capacity for the seal cannot be secured, there would be occasions when oil flowing into the capillary seal 118 is not taken up completely, such that the oil would flow out to the exterior of the capillary seal 118. If escaped oil adheres to the hard disks in the disk-drive area, or to the magnetic heads arranged in close proximity to the disks, the oil will become a cause that gives rise to read/write errors.

Against this backdrop, attempting to secure sufficient axial extent for the capillary seal 118 to retain that portion by which the oil has volumetrically increased as just described would constrain the axial dimension of the pair of radial bearing sections 106 ranged axially in line with the capillary seal 118, which would prove prohibitive of ensuring requisite bearing stiffness in the radial bearing sections 106. Moreover, securing the axial extent that the snugged-fit section 116 between the shaft 102 and rotor hub 114, which is likewise ranged axially in line with the capillary seal 118, requires would also prove to be problematic.

A further consideration in designing miniature, slim spindle motors is that thus scaling the motors entails as a matter of course that the various parts constituting the motor are also miniaturized and reduced-profile. This means that the mechanical strength of the various parts is that much the weaker, and thus the influence that manufacturing stresses, occurring in processes such as pressure-fitting or bonding the parts together, have on the surface precision of and distortion in the parts proves to be considerable.

For example, when a rotor magnet 120 is to be adhesively fastened to the rotor hub 114, because the rotor magnet 120 is not a very high-strength component, as a means for fixing the two, the rotor magnet 120 cannot be snug-fitted into the inner bore of the rotor hub 114 by making the outer diametrical dimension of the rotor magnet 120 somewhat larger than the inner diametrical dimension of the rotor hub 114 and then wedging the rotor magnet 120 into the rotor hub 114.

It is consequently the general rule that this so-called outer-rotor type of spindle motor, in which the cylindrical outer surface of the rotor magnets 120 is adhesively fastened to the cylindrical inner surface of the rotor hub 114, is designed so that the separation between the inner diameter of the cylindrical inner surface of the rotor hub 114 and the outer diameter of the cylindrical outer surface of the rotor magnets 120 forms a clearance of several µm. But precisely because the clearance formed is only a few µm, it is difficult to get the amount of adhesive that is applied to be uniform over the entire circumference of the joint. For this reason, if the rotor hub 114 is of short axial and/or radial dimension, stresses produced by hardening and contracting of the adhesive become non-uniform along the circumference, which creates distortion in the joined components. Such distortion is prohibitive of mounting the recording disk(s) on the rotor hub 114 so that the recording face is virtually orthogonal with respect to the center axis of the spindle motor, such that RRO (repeatable runout) worsens.

SUMMARY OF INVENTION

An object of the present invention is in a spindle motor furnished with a fluid-dynamic-pressure bearing to assure requisite bearing stiffness in the radial and thrust bearing sections, precision in the right-angularity between the shaft and the rotor hub, and sufficient axial extent for the capillary seal area, and at the same time to realize overall miniaturization and reduction in the elevational dimension of the motor.

A further object of the present invention is in the manufacturing process of assembling a miniaturized and flattened spindle motor, to eliminate stress deformation of the rotor hub and thereby improve the reliability of the motor.

In order to resolve the problems noted earlier, a fluid-dynamic-pressure bearing in one example of the present invention comprises: a shaft; a top plate fixed to the upper portion of the shaft; a thrust plate fixed to the bottom portion of the shaft; a sleeve, either the sleeve or the shaft being rotatable relative to the other; a bearing housing that on its cylindrical inner surface retains the sleeve and whose lower end is closed off. A continuous micro-gap is formed in between the shaft and the sleeve and the top plate and the sleeve, and the micro-gap is filled with a lubricating fluid.

A radial bearing section provided with dynamic-pressure-generating grooves that induce dynamic pressure in the lubricating fluid when either the shaft or the sleeve spins is formed in between the cylindrical outer surface of the shaft and the cylindrical inner surface of the sleeve. An upper thrust bearing section provided with dynamic-pressure-generating grooves that induce dynamic pressure in the lubricating fluid when either the shaft or the sleeve spins is formed in between the undersurface of the top plate and the top-edge surface of the bearing housing. A lower thrust bearing section provided with dynamic-pressure-generating grooves that induce dynamic pressure in the lubricating fluid when either the shaft or the sleeve spins is formed in between the bottom-edge surface of the sleeve and the top of the brim of the thrust plate.

In this fluid-dynamic-pressure bearing in one example of the present invention, the conventional thrust bearing section formed in between the bottom of the brim of the thrust plate and the top side of the counterplate has been eliminated. Then a thrust bearing section is novelly formed in between the top-edge surface of the bearing housing and the undersurface of the top plate. This means that the axial extent of the thrust plate may be just that dimension sufficient to produce the requisite bearing stiffness for forming the lower thrust bearing section. Accordingly, the axial dimension of the thrust plate can be made thinner by comparison to what has conventionally been the case; moreover, the axial dimension of the counterplate can also be made thinner. This enables a spindle motor furnished with a fluid-dynamic-pressure bearing to be miniaturized and flattened.

From the following detailed description in conjunction with the accompanying drawings, the foregoing and other objects, features, aspects and advantages of the present invention will become readily apparent to those skilled in the art.

DETAILED DESCRIPTION

Figure 1:
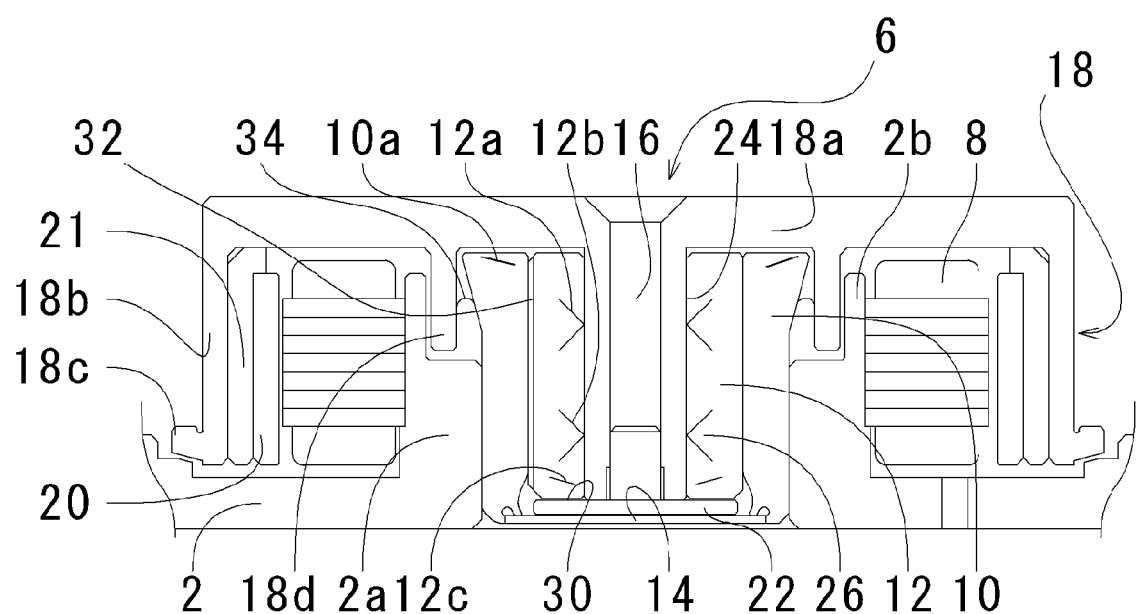
FIG. 1 is a vertical sectional view illustrating an embodiment of the present invention.

Below, a fluid-dynamic-pressure bearing involving the present invention, a spindle motor furnished with the fluid-dynamic-pressure bearing, and a recording-disk drive furnished with the spindle motor will be explained with reference to FIGS. 1 through 5. It should be understood that in the embodiments illustrating the present invention, for the sake of convenience the upward and downward orientations in the drawings are rendered "upper/lower," "top/bottom," "along the vertical," etc., but that is not intended to limit the orientation of the bearing, motor, and disk drive of the invention in an actually installed situation.

A spindle motor involving the present embodiment is basically composed of, as depicted in FIG. 1: a bracket 2; a bearing housing 10 fixed into the bracket 2; a sleeve 12 fixed to the cylindrical inner periphery of the bearing housing 10; and a rotor 6 rotatively supported by means of the sleeve 12.

An annular boss 2a encompassing a center hole in which the bearing housing 10 is snug-fitted to anchor it, is provided in the central portion of the bracket 2, wherein a round cylinder portion 2b, onto which a stator 8 is fixed by pressure-fitting and/or adhesive attachment, is formed along the outer rim of the boss 2a. The bearing housing 10 is fixed along the inner circumference of the boss 2a by pressure-fitting and/or adhesive attachment.

Figure 6:
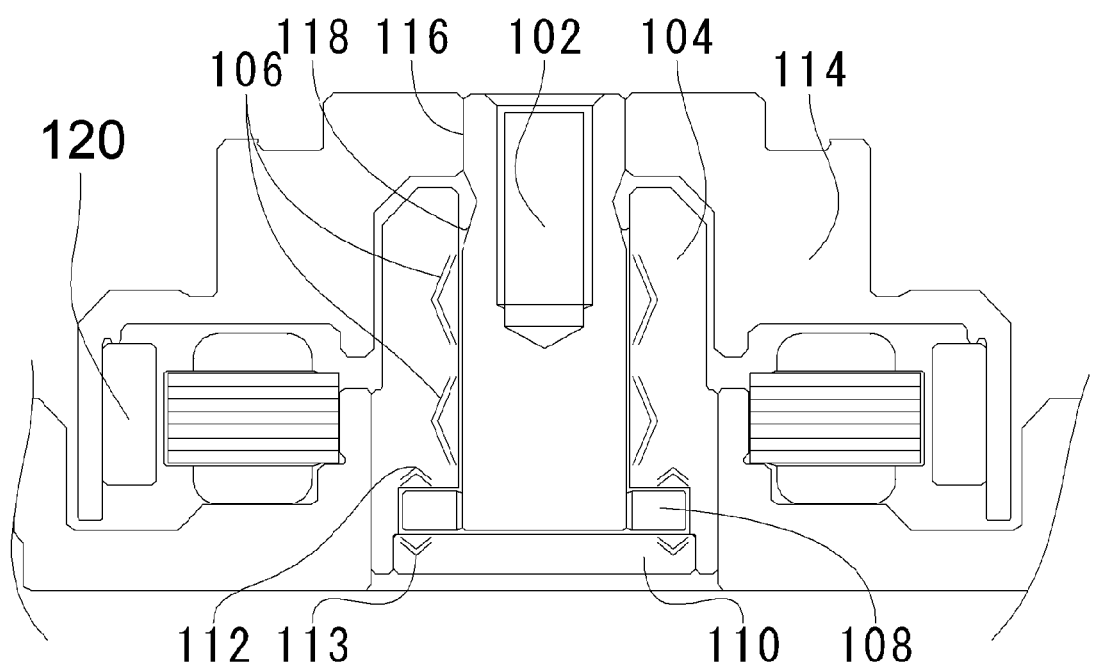
FIG. 6 is a vertical sectional view illustrating a conventional spindle motor.

The hollow cylindrical bearing housing 10 is furnished with a planar counterplate 14 that closes off the axially lower side of the bearing housing 10. The bearing housing 10 is wrought from a constituent whose thermal expansion coefficient is smaller than that of a rotor hub 18 to be detailed later. To be specific, the constituent may be JIS-grade SUS 303 steel (thermal expansion coefficient: $17.3 \times 10^{-6}/°$ C.), SUS 304 steel (thermal expansion coefficient: $16.3 \times 10^{-6}/°$ C.), SUS 420J2 steel (thermal expansion coefficient: $10.4 \times 10^{-6}/°$ C.), or a synthetic resin polymer. The cylindrical sleeve 12, through the center portion of which a bearing bore pierces axially, is fixed by means such as an adhesive to the cylindrical inner surface of the bearing housing 10. The sleeve 12 is molded from a porous, oil-impregnated sintered compact, the substance of which is not particularly limited; a cast and sintered object is used, with various metal powders, metal-compound powders, and non-metal powders being the source material. For example, the sleeve contains as the source material such metal compounds as Fe—Cu, Cu—Sn, Cu—Sn—Pb, or Fe—C, and has a thermal expansion coefficient of $12.9 \times 10^{-6}/°$ C. It should be noted that the bearing housing 10 and sleeve 12 as described should be of a constituent material whose thermal expansion coefficient is smaller than that of the later-described rotor hub 18; thus the components are formable from, for example, copper or a copper alloy. The rotor 6, which is the rotary component of the spindle motor in this embodiment, is composed of a shaft 16 opposing the cylindrical surface of the sleeve 12 across a radial gap, and the rotor hub 18, which is roughly cup-shaped ad formed integrally with the shaft 16. Thus forming integrally the shaft 16 and the rotor hub 18 serves to prevent incidents caused, in a rotor having a snugged-fit section, as described previously with reference to FIG. 6, by insufficient clamping strength between its shaft 116 and rotor hub 114—incidents including degradation in such aspects of assembly precision as the angularity of the shaft 102 with respect to the rotor hub 114, and the shaft 102 falling out of the rotor hub 114. Another advantage is that thanks to the solidified strength achievable in how the shaft 16 and the rotor hub 18 are joined, a miniaturized, flattened motor may be realized.

The rotor hub 18 is configured to include: a top-wall portion 18a that axially opposes the top-edge surfaces of the bearing housing 10 and the sleeve 12; a cylindrical wall portion 18b that axially depends from the outer perimeter of the top-wall portion 18a; and, at the lower side of the cylindrical wall portion 18b, a flange portion 18c extending radially outward from the cylindrical exterior surface of the cylindrical wall portion 18b. Hard disks (shown in the FIG. 5 diagram with reference mark 46) abut against, as well as ride on, the cylindrical outer surface of the cylindrical wall portion 18b as well as the flange portion 18c. Furthermore, an annular yoke 21—onto the inner periphery of which a rotor magnet 20 is fixed by an adhesive or like means, and which is wrought from a ferromagnetic-ingredient stainless steel—is adhesively fastened to the cylindrical inner surface of the cylindrical wall portion 18b. A rotor hub 18 having this configuration can be wrought from a constituent whose thermal expansion coefficient is larger than that of the sleeve 12. A specific example is forming the rotor hub 18 from an aluminum such as JIS-grade A6061 (thermal expansion coefficient: $23.6 \times 10^{-6}/°$ C.) or an aluminum alloy.

The spindle motor configuration further includes a thrust plate 22, being a circular component, fixed to the axially lower end of the shaft 16. The top and bottom sides of the thrust plate 22 respectively oppose across an axial gap the bottom-edge surface of the sleeve 12, and the top marginal surface of the counterplate 14, while the circumferential surface of the thrust plate 22 opposes across a radial gap the cylindrical inner surface of the bearing housing 10. Here, while the substance of the thrust plate 22 may be selected appropriately according to the mechanical strength and dimensional stability that are required, since the thrust plate 22 is fixed to the end of the shaft 16 and rotates unitarily with the shaft 16, the thrust plate substance advisably has a thermal expansion coefficient on par with that of the shaft 16.

In a spindle motor configuration as described above, the gap between the underside of the top-wall portion 18a of the rotor hub 18, and the top-edge surfaces of the bearing housing 10 and the sleeve 12, the gap between the cylindrical inner surface of the sleeve 12 and the cylindrical outer surface of the shaft 16, and the gaps between the bottom-edge surface of the sleeve 12 and the top marginal surface of the counterplate 14, and the top and bottom sides of the thrust plate 22, are continuous. With oil thus being retained without interruption in the successively joined gaps in this configuration, a full-fill structure is formed.

The upper portion of the bearing housing 10 is sloped along the outer circumferential surface, constricting in outer diameter heading axially downward (toward the bracket 2) from its top-edge surface. In a locus diametrically opposing the sloped surface of the bearing housing 10, a circumventive projection 18d depending from the top-wall portion 18a of the rotor hub 18 is formed. The clearance dimension defined by the diametrical gap between the outer circumferential surface of the bearing housing 10 upper portion, and the circumventive projection 18d from the top-wall portion 18a grows gradually larger parting away from the top-wall portion 18a, heading axially downward. In effect, the outer circumferential surface of the bearing housing 10 upper portion and the circumventive projection 18d from the top-wall portion 18a interact to constitute a capillary seal 34. Thus, only in this taper seal 34 does the oil retained in the bearing-section gaps described above meet the air—in an interface where the surface tension of the oil and atmospheric pressure balance, forming the oil-air interface into a meniscus.

Forming the capillary seal 34 diametrically outside both the sleeve 12 and the bearing housing 10 allows sufficient axial extent and volumetric capacity to be secured for the capillary seal 34, without compromising the bearing stiffness of upper and lower radial bearing sections 24 and 26, to be described later, formed in the micro-gap in between the cylindrical inner surface of the sleeve 12 and the cylindrical outer surface of the shaft 16. The configuration thus makes it possible to prevent outflux of oil to the motor exterior, and contributes to the provision of a fluid-dynamic-pressure bearing excelling in dependability and durability, and a spindle motor furnished with the fluid-dynamic-pressure bearing.

Next, an explanation of the bearing structure will be made using FIGS. 2 and 3.

Figure 2:
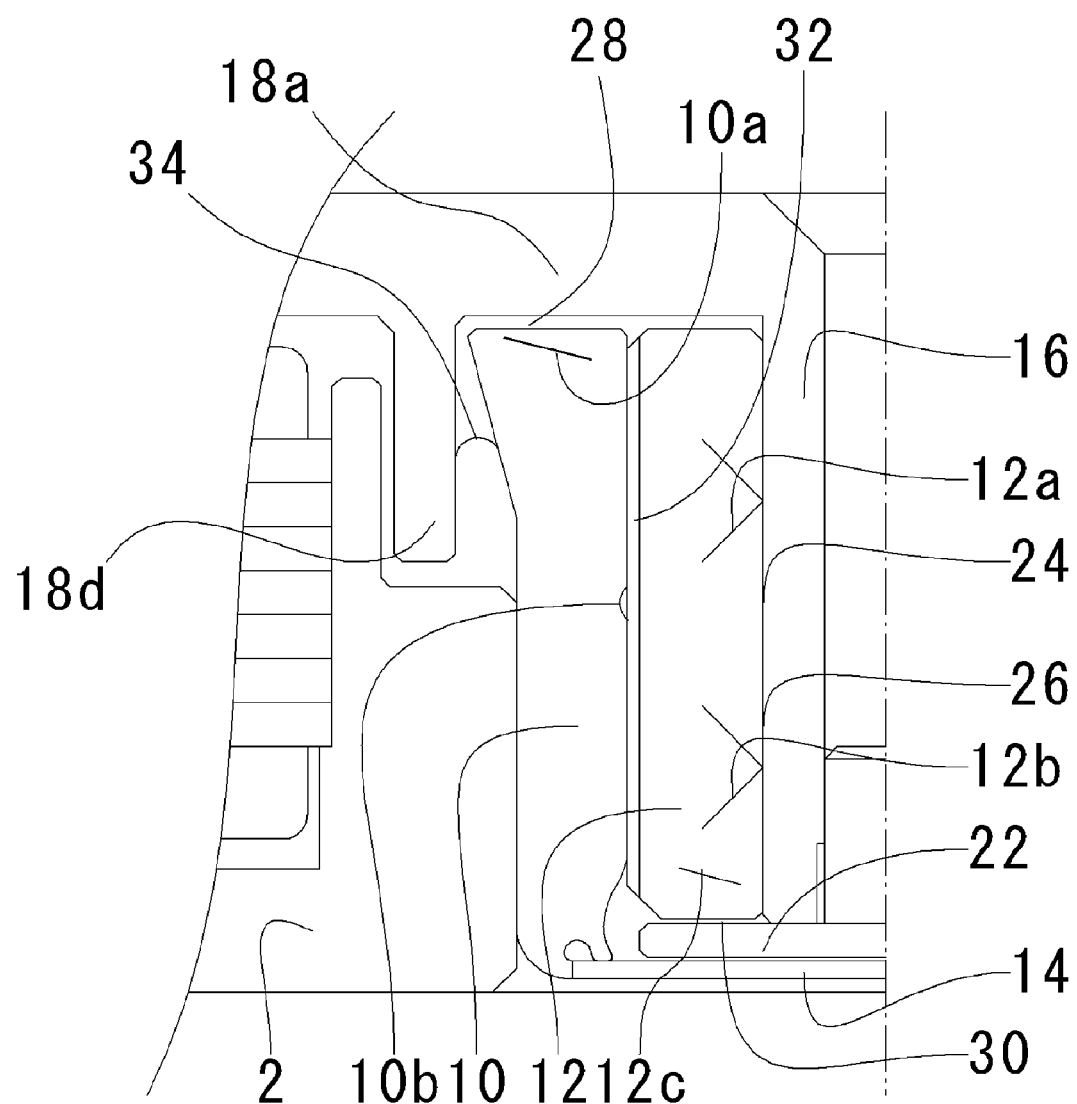
FIG. 2 is magnified sectional view of a key region involving the FIG. 1 embodiment of the present invention.

As illustrated in FIG. 2, an upper radial bearing section 24 and a lower radial bearing section 26, separated at an axial span, are provided in the radial gap between the cylindrical inner surface of the sleeve 12 and the cylindrical outer surface of the shaft 16. The upper radial bearing section 24 and lower radial bearing section 26 are configured by the cylindrical inner surface of the sleeve 12, the cylindrical outer surface of the shaft 16, and oil retained in the gap where the two components oppose each other radially.

Figure 3A:
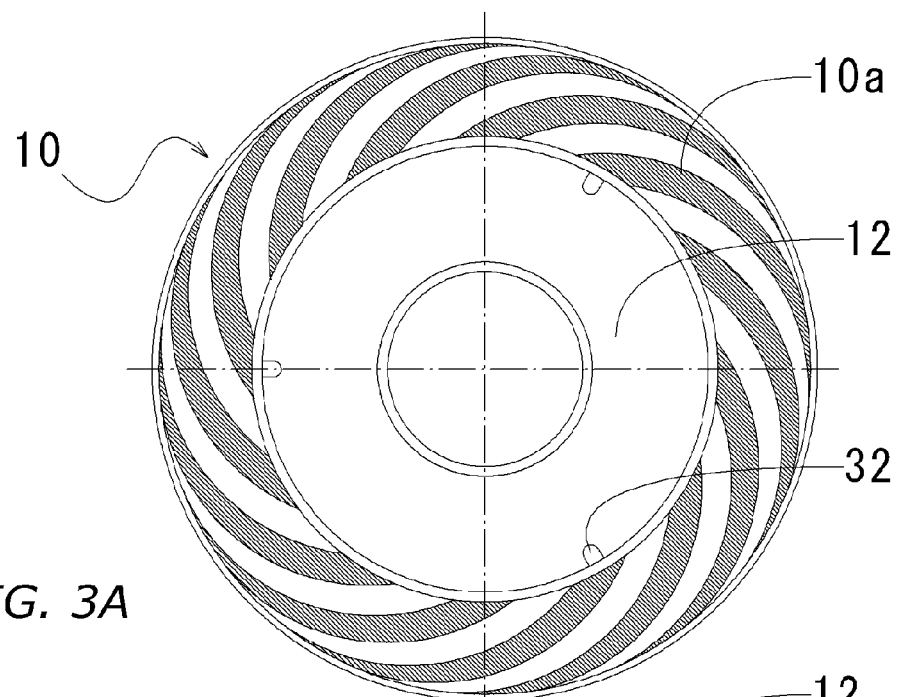
FIG. 3A is a view sectioned through the shaft to illustrate the top-edge surfaces of a sleeve and a bearing housing of the present invention.
Figure 3B:
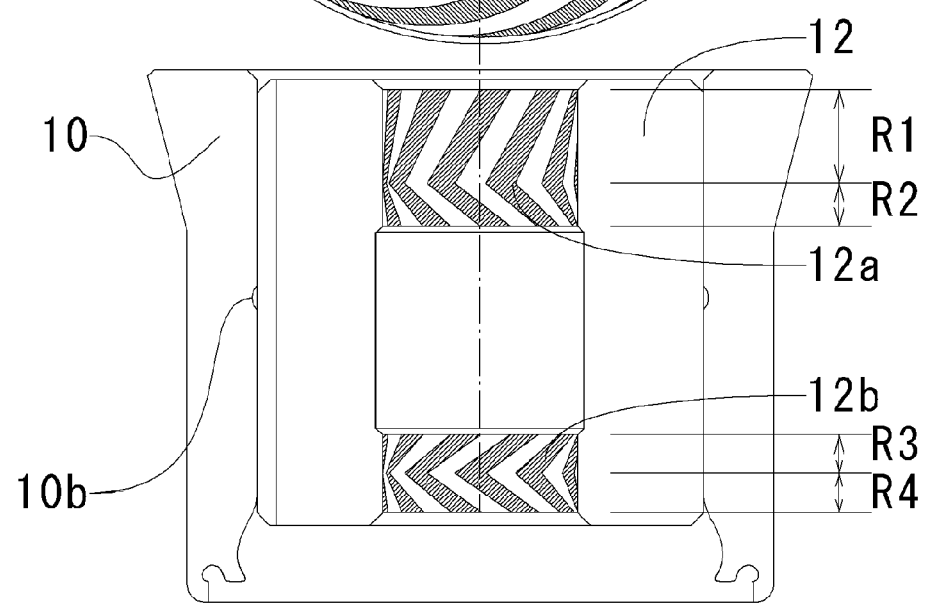
FIG. 3B is vertical sectional view of the sleeve and bearing housing.

As represented in FIG. 3B, in the locus where the upper radial bearing section 24 along the cylindrical inner surface of the sleeve 12 is configured, oil is induced from either axis-wise edge toward the approximate midportion of the upper radial bearing section 24. Herringbone grooves 12a having an imbalanced geometry axis-wise (R1>R2) are formed in this upper radial-bearing locus along the sleeve 12 inner surface. Thus, when the rotor 6 rotates, a mobilizing pressure by which the oil heads axially downward (toward the lower radial bearing section 26) develops. In particular, although oil is induced toward the midportion of the upper radial bearing section 24, because the herringbone grooves 12a form an axially imbalanced geometry, the pressure becomes maximum where the oil is slightly below the middle of the upper radial bearing section 24, supporting the rotor 6; and to the extent that the grooves 12a are imbalanced, the oil is urged to flow axially downward.

Likewise, in the locus where the lower radial bearing section 26 along the cylindrical inner surface of the sleeve 12 is configured, oil is induced from either axis-wise edge toward the approximate midportion of the lower radial bearing section 26. Herringbone grooves 12b having an essentially balanced geometry axis-wise (R3=R4) are formed in this lower radial-bearing locus along the sleeve 12 inner surface. When the rotor 6 rotates, a pressure heading from either axis-wise edge toward the approximate midportion of the lower radial bearing section 26 is induced in the oil. In particular, although oil is induced toward the midportion of the lower radial bearing section 26, because the herringbone grooves 12b form an axially balanced geometry, the pressure becomes maximum where the oil is approximately in the middle of the lower radial bearing section 26, supporting the rotor 10.

The description now turns to the thrust bearings. The top-edge surface of the bearing housing 10 and the underside of the top-wall portion 18a of the rotor hub 18 oppose each other via an axial micro-gap, and an upper thrust bearing section 28 is provided in the micro-gap. The upper thrust bearing section 28 is configured by the top-edge surface of the bearing housing 10, the underside of the top-wall portion 18a of the rotor hub 18, and oil retained in the gap where the two components oppose each other axially.

Then, as represented in FIG. 3A, spiral grooves 10a are formed in the top-edge surface of the bearing housing 10 so that the oil is induced radially inward (toward the upper portion of the shaft 16 cylindrical outer surface) during motor rotation. When the rotor 6 spins, dynamic pressure heading radially inward is developed in the upper thrust bearing section 28 by the spiral grooves 10a. This radially inward-moving dynamic pressure puts lift on the rotor 6 and heightens the internal pressure of oil inward of the thrust bearing section 28. The oil pressure thus being always kept high with respect to the external air prevents the turning into bubbles of air that has dissolved into the oil.

Likewise, a lower thrust bearing section 30 is formed in the axial gap between the bottom-edge surface of the sleeve 12 and the top marginal surface of the thrust plate 22. The lower thrust bearing section 30 is configured by the bottom-edge surface of the sleeve 12, the top marginal surface of the thrust plate 22, and oil retained in the gap where these two components oppose each other axially. In turn, spiral grooves 12c are formed in the bottom-edge surface of the sleeve 12 so that the oil is induced radially inward (toward the bottom portion of the shaft 16 cylindrical outer surface) during motor rotation. When the rotor 6 spins, dynamic pressure heading radially inward is developed in the lower thrust bearing section 30 by the spiral grooves 12c.

Accordingly, the upward-lifting action on the rotor 6 by the upper thrust bearing section 28 and the downward-thrusting action on the thrust plate 22 by the lower thrust bearing section 30 pressure the rotor 6 up and down. And in the location where these dynamic-pressure forces balance, the position where rotational lift situates the rotor 6 is stabilized. The upper and lower thrust bearing sections 28 and 30 are designed so that the axial bearing forces generated in these bearing sections 28 and 30 operate interactively from mutually opposing directions, thereby to stably support the rotation of the rotor hub 18.

It should be understood that while in this case spiral grooves are formed in both the upper and lower thrust bearing sections 28 and 30, the design of the bearing sections is not so limited, in that is also possible for the grooves in one or the other, or both, of the upper and lower thrust bearing sections 28 and 30 to have a herringbone configuration. In such an alternative design, if herringbone grooves are formed in the upper thrust bearing section 28, it is advantageous that the grooves have an imbalanced herringbone configuration through which the oil is directed radially inward by the dynamic pressure that the grooves produce. This is because the radially inward-directed oil dynamic pressure heightens the internal pressure of the oil as a whole radially inward of the imbalanced herringbone grooves to prevent the pressure from going negative, which thereby prevents air bubbles from arising in the oil.

When the sleeve 12 made of the sintered material is press-molded, the herringbone grooves 12a and 12b provided in the upper and lower thrust bearing section 24 and 26, and the spiral grooves 12c provided in the lower thrust bearing section 30 can be wrought in a like manner. In this way an inexpensive sleeve 12 can be fashioned.

In the present embodiment, the conventional thrust bearing formed in between the underside of the thrust plate and the top marginal surface of the counterplate has been eliminated. And a concurrent feature is the thrust bearing section novelly formed in between the top-edge surface of the bearing housing 10 and the underside of the top-wall portion 18a of the rotor hub 18. This means that the axial thickness of the thrust plate 22 may be just that dimension sufficient to produce the requisite bearing stiffness for forming the lower thrust bearing section 30. Accordingly, the axial dimension of the thrust plate 22 can be made thinner by comparison to what has conventionally been the case. In addition, the axial dimension of the counterplate 14 upper face can also be made thinner. The spindle motor can thereby be miniaturized and flattened.

In conventional implementations in which the shaft and sleeve have not undergone any surface treatment whatsoever, if the shaft and sleeve come into contact, one or the other, or both, of the components will become worn, which ends up seriously compromising the endurance of the shaft and sleeve. In order to prevent such detriment to the durability of the shaft and sleeve, and in order to ensure sufficient mechanical strength to support the rotor, conventionally a hardening treatment such as nitriding has been carried out on the bearing-surface-constituting shaft cylindrical outer surface and sleeve cylindrical inner surface.

In the present embodiment, however, a porous sintered material into which oil has been impregnated is utilized for the sleeve. Utilizing a sleeve of a sintered substance means that during motor rotation, oil oozes out onto the bearing-surface-constituting cylindrical inner surface of the sleeve, constantly creating a consistent oil film in between the rotating shaft cylindrical outer surface, and the sleeve cylindrical inner surface. This makes it possible to achieve superior sliding performance between the shaft and sleeve. A consequent benefit is that stabilized rotational performance can be achieved without having to conduct a hardening treatment such as nitriding on the cylindrical surface of the shaft. Not carrying out a hardening treatment on the shaft cylindrical outer surface enables the fluid-dynamic-pressure bearing to be manufactured at low cost, and an inexpensive motor to be manufactured.

It should be noted that the arithmetic mean roughness (roughness average Ra) of the shaft cylindrical surface is 0.1 µm or more and 1.6 µm or less, and preferably is from 0.3 µm to 0.8 µm. This surface smoothness enables all the better sliding performance to be gained from the shaft, further enabling stabilized rotational performance to be achieved.

As depicted in FIGS. 2 and 3, axial grooves that penetrate the axis-wise ends of the sleeve 12 are formed in the outer periphery of the sleeve 12 by a pressing or cutting operation so as to have a roughly oblong or semicircular contour in cross section. When the sleeve 12 is attached to the cylindrical inner surface of the bearing housing 10, between themselves and the cylindrical inner surface of the bearing housing 10 the axial grooves form communicating pathways 32 that penetrate through the axially upper end to the axially lower end of the sleeve 12. The interior of the communicating pathways 32 is filled with oil, wherein the internal pressure of the oil in the passages equalizes with the internal pressure of the oil retained in the bearing sections.

In bearing implementations without such oil communicating pathways 32, due to the influence of manufacturing discrepancies in the components, the oil pressure along the periphery of the thrust plate 22 at times goes low—becoming so-called negative pressure—by comparison to atmospheric pressure. In particular, within the micro-gap formed between the cylindrical inner surface of the sleeve 12 and the cylindrical outer surface of the shaft 16, if the width dimension of the micro-gap along the axially upper end of these components has been formed broader than the width dimension along the lower end, then there would be a concern lest the dynamic pressure generated in the lower radial bearing 26 end exceed the dynamic pressure generated in the upper radial bearing 24, producing an oil flow that from the axially lower side of the bearing heads toward the upper side, and making the internal pressure of the oil retained in the gap between the outer periphery of the thrust plate 22 and/or the underside of the thrust plate 22, and the top marginal surface of the counterplate 14 go negative.

By the same token, if due to manufacturing discrepancies as just noted, within the micro-gap formed between the cylindrical inner surface of the sleeve 12 and the cylindrical outer surface of the shaft 16, if the width dimension of the micro-gap along the axially upper end of these components has been formed narrower than the width dimension along the lower end, for example, then there would be a concern lest the dynamic pressure that the herringbone grooves 12a provided in the upper radial bearing section 24 generate go over a predetermined set pressure, producing negative pressure in the gap between the bottom marginal surface of the thrust plate 22 and the top marginal surface of the counterplate 14.

Nevertheless, despite such discrepancies, by providing the communicating pathways 32 in the bearing, the oil pressure along the outer periphery of the thrust plate 22 is forcibly drawn toward the same level as the pressure along the inner periphery of the thrust bearing section 28. When the motor spins, the oil pressure along the inner periphery of the thrust bearing section 28 becomes constantly higher than atmospheric pressure to the extent of the dynamic pressure generated by this section of the bearing's spiral grooves, represented in FIG. 3A. Accordingly, even should the oil pressure along the outer periphery of the thrust plate 22 lower due to manufacturing discrepancies or external disturbances, the likelihood of the pressure going under atmospheric pressure is almost nil. Negative pressure in the oil along the outer periphery of the thrust plate 22 is thereby prevented.

If due to the abovementioned manufacturing discrepancies oil streams from the upper to the lower axial end of the bearing, there would be a further concern lest the internal pressure of the oil in the gap between the bottom side of the thrust plate 22 and the top side of the counterplate 14 rise higher than necessary and produce excessive over-lift on the rotor 6.

To counter this, by providing the communicating pathways 32, even should a difference arise between the oil internal pressure along the upper axial end and the oil internal pressure along the lower axial end of the micro-gap formed in between the cylindrical inner surface of the sleeve 12 and the cylindrical outer surface of the shaft 16, because a flux of oil through the communicating pathways 32 from the internal-pressure high end to the low end will occur, the internal pressure of the oil retained in the bearing sections will balance. This balancing of the oil internal pressure prevents incidents of negative pressure in, as well as over-lift due to overly high pressure from, the fluid-dynamic-pressure bearing.

Rendering the dynamic-pressure-generating grooves provided in the upper radial bearing section 24 asymmetrical herringbone grooves 12a to induce in the oil dynamic pressure that pressures the oil toward the axial lower end of the bearing further prevents incidents of negative pressure by keeping the pressure in the region in between the upper radial bearing section 24 and the lower radial bearing section 26 at positive pressure above the atmospheric level. Furthermore, owing to the pressuring force that the herringbone grooves 12a produce, the oil is constantly pressurized so as to stream—wherein a concatenated oil recirculation path is formed—from the lower radial bearing section 26 and from in between the bottom marginal surface of the sleeve 12 and the top marginal surface of the counterplate 14, via the communicating pathways 32 and also the interval between the top marginal surface of the sleeve 12 and the underside of the top-wall portion 18a of the rotor hub 18, toward the axially upper end of the cylindrical outer surface of the shaft 16 and the cylindrical inner surface of the sleeve 12, and flow back into upper radial bearing section 24.

Thus being pressured to flow through the recirculation path, the oil within the bearing is always coursing in a constant direction, which serves to balance the pressure, and this therefore prevents air bubbles from arising and over-lift on the rotor 6 from occurring. What is more, since the range of tolerance for manufacturing discrepancies is markedly expanded, production yields are improved.

A further feature of the oil recirculation path is that disposing the communicating pathways 32 so that one end where they open is to the radially inward side of the upper thrust bearing section 28 makes it so that within the region where the pressure is higher than the atmospheric level the oil pressure is kept constant.

Because this enables sufficient bearing stiffness to be achieved when predetermined dynamic pressure is being generated in the bearing sections during steady motor rotation, the likelihood of contact and slipping arising in the bearing sections is low.

Another advantage is that forming the shaft 16 and the rotor hub 18 from a constituent whose thermal expansion coefficient is higher than that of the bearing housing 10 and the sleeve 12 means that under a high-temperature environment, because of the relationship between their thermal expansion coefficients the amount by which the shaft 16 and rotor hub 18 expand thermally exceeds the amount by which the bearing housing 10 and the sleeve 12 expand thermally.

Owing to this designed difference in thermal expansion coefficient in the bearing sections, under a high-temperature environment the dimension of the gap between the bearing housing 10 and the sleeve 12 where they oppose the shaft 16 and the rotor hub 18 grows smaller, enabling loss in bearing stiffness to be prevented even with the viscosity of the oil decreasing as the oil expands thermally at higher temperature. This means that a predetermined bearing stiffness can be secured without increasing the motor's power consumption.

Additionally in terms of motor operation under a high-temperature environment, at the same time the viscosity of the oil decreases the volume increases. That portion by which the oil has volumetrically increased consequently flows into the capillary seal 34, and not being able to secure sufficient capacity in the capillary seal 34 would ultimately lead to the oil leaking out to the motor exterior. In a bearing involving the present invention, however, the capillary seal 34 is formed along the circumferential periphery of the bearing housing 10, in an orientation opening downward axis-wise. This configuration, compared with that of a conventional bearing as in FIG. 6, enables a seal area of more sufficient capacity to be secured. Moreover, since the thermal expansion coefficient of the circumventive projection 18d formed integrally with the rotor hub 18 is larger than the thermal expansion coefficient of the bearing housing 10 situated radially inward of the circumventive projection 18d, under a high-temperature environment the radial extent of the gap where the capillary seal 34 forms grows larger. This allows the capacity for the capillary seal 34 to retain oil to be increased, which enables the portion by which the oil has volumetrically increased to be sufficiently taken up within the capillary seal 34.

A method of manufacturing the rotor will next be described. At first a round platelike blank, wrought by cutting from a barstock of aluminum or like metal, is worked into the form of the shaft 16 and rotor hub 18 by, for example, a pressing, forging, or other suitable operation. Next the yoke 21, having adhesively fastened to its cylindrical inner surface the rotor magnet 20, is fixed to the cylindrical inner surface of the cylindrical wall portion 18b of the rotor hub 18 by press-fitting and/or by means of an adhesive. Then in the central potion of the shaft 16 a through-hole is bored, and threads are cut into a section of the hole, by a tapping operation. Finally, the cylindrical outer surface of the shaft 16 and the undersurface of the top-wall portion 18a of the rotor hub 18—surfaces in which the grooves for the dynamic-pressure bearing will be formed—and the disk-carrying face of the flange portion 18c of the rotor hub 18 cylindrical wall portion 18b undergo a milling operation that finishes these surfaces to a high degree of precision.

In manufacturing this component of spindle motors, while fashioning the rotor 6 by forging aluminum stock allows the rotor hub to be manufactured inexpensively, the downside is that the radial and axial dimensions of the rotor hub 18 are made thinner, compromising the rigidity of the rotor hub 18. Since press-fitting the rotor magnet 20 against, to anchor it to, the cylindrical wall portion 18b as described earlier can lead to the rotor magnet becoming chipped, the fastening between the rotor magnet and the cylindrical wall portion is generally accomplished by adhesive fixation using an adhesive agent. In that regard, even in an implementation in which the rotor hub is fashioned from a comparatively high-strength martensitic or austenitic stainless steel, for example, and the rotor magnet is adhesively fastened to the cylindrical inner surface of the cylindrical wall portion of the rotor, stresses due to hardening and contracting of the adhesive, caused by the adhesive agent being spread non-uniformly along the wall circumference, act non-uniformly on the flange portion of the rotor, which is adjacent to where the rotor magnet is fixed. The impact of the non-uniformly acting stresses ends up deforming the flange, and deformation of the flange means loss of parallelism of the hard disks carried by the flange, which makes RRO worse. Worsening in RRO can ultimately lead to the occurrence of so-called head crashes, in which the recording face of the hard disks and the magnetic heads arranged in close proximity to the disks come into contact.

To address such problems, a yoke 21 made from stainless steel is readied, and the rotor magnet 20 is adhesively fixed to the cylindrical inner surface of the yoke. After that, the yoke 21 is press-fit against, to adhere it to, the cylindrical inner surface of the cylindrical wall portion 18b of the rotor 6, and then the flange portion 18c of the rotor 6 is finished by means of a milling operation. As a result, stresses arising in non-uniform hardening and contracting of the adhesive are absorbed by the yoke 21, whereby negative impact on the cylindrical wall portion 18b can be averted. An additional advantage to anchoring a yoke 21 to the cylindrical inner surface of the cylindrical wall portion 18b of the rotor hub 18 is that it enables the rigidity of the radially thin-dimensioned cylindrical wall portion 18b of the rotor hub to be enhanced. This makes it possible to prevent sagging and deformation of the cylindrical wall portion 18b due to excessive centrifugal or other force being applied to the cylindrical wall portion 18b during rotation of the motor. What is more, the fact that the workability of the shaft 16 and rotor hub 18 is high because they are fashioned from aluminum or a like metal—which means that they can readily be high-precision processed—enables processing costs to be reduced.

It will be appreciated that after carrying out the procedure just described for manufacturing the rotor 6, a hardening treatment, such as a plating or a nitriding process, can also be carried out on, for example, the cylindrical outer surface of the shaft 16 and the undersurface of the top-wall portion 18a of the rotor hub 18.

Figure 4:
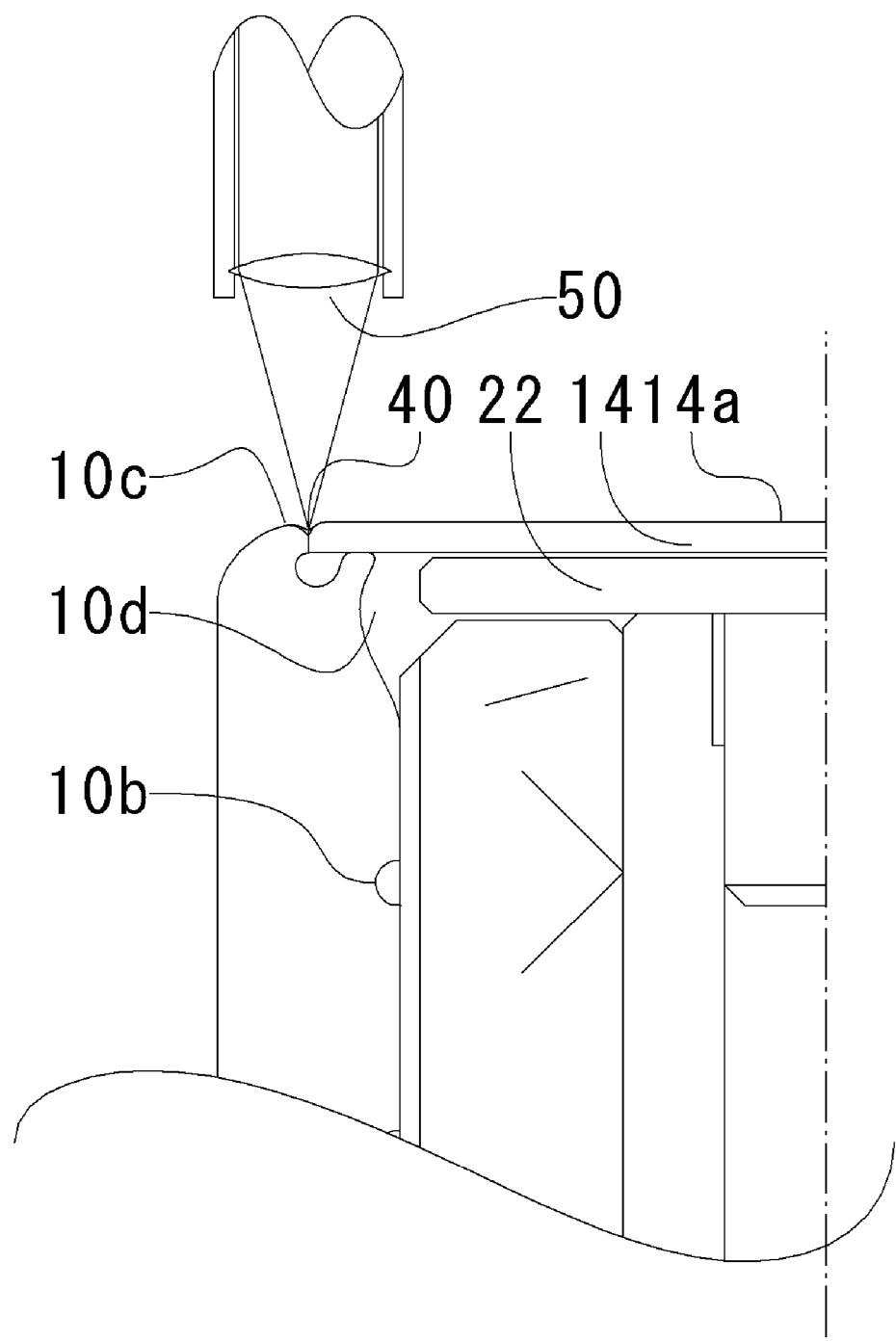
FIG. 4 is a sectional view illustrating a welding operation in the FIG. 1 embodiment of the present invention.

With reference to FIGS. 2, 3 and 4, an explanation of a method of assembling a motor according to the present invention will next be made.

Initially an adhesive agent is applied into an adhesive groove 10b formed circumferentially along the cylindrical inner surface of the bearing housing 10. Then the sleeve 12 is inserted upward through the axially lower side of, to fix it into, the bearing housing 10. During this operation, the adhesive is grazed by the sleeve 12, but the fact that the adhesive is accommodated within the adhesive groove 10b means that even should, for example, the position where the adhesive is applied and the amount applied be non-uniform, the adhesive can be prevented from creeping axially upward.

A further advantage to providing the adhesive groove 10b is that it makes for firmed clinching strength between the bearing housing 10 and the sleeve 12, which contributes to achieving greater strength against external impact and shock. Accordingly, the bearing housing 10 and sleeve 12 can be anchored firmly even in a miniaturized, flattened motor.

It will be appreciated that the adhesive agent may be applied to the cylindrical outer surface of the sleeve 12, or it may be applied to both the cylindrical outer surface of the sleeve 12 and to the cylindrical inner surface of the bearing housing 10. Likewise, the adhesive groove 10b may be formed in duplicates in a number of places on the cylindrical inner surface of the bearing housing 10. In another alternative configuration, adhesive grooves may be formed as axially extending vertical striations in the cylindrical inner surface of the sleeve 12.

Next the thrust plate 22 is snuggedly inserted and fixed by means of an adhesive into the through-hole provided in the central portion of the shaft 16. Then the counter-plate 14 is snuggedly inserted into the bearing housing 10 to close off the bottom portion of the bearing housing 10. It is to be noted that once the counterplate 14 has been installed, its underside 14a, as indicated in the FIG. 4 view, is disposed flush with the bottom marginal surface 10c of the bearing housing 10.

Next the rotor hub is held in a (not-illustrated) jig, and with it retaining the rotor hub the jig is rotated at low-speed constant velocity. Then, with the jig rotating, from a laser device having an irradiation window 50 axially above the abutment 40 between the bearing housing 10 and the outer perimetric surface of the counterplate 14, as a directable energy beam a laser beam is directed onto the abutment 40 to weld the abutment 40 along its circumference. By comparison to other welding methods—for example, arc welding and resistance welding—this laser welding technique enables high clinching strength to be achieved with little applied energy. In addition, because vacuum equipment is rendered unnecessary with laser welding, handling is facilitated, and secure welds within narrow confines are made possible through the excellent directivity of the beam.

In this way irradiating the counterplate 14 with a laser to weld-anchor it to the bearing housing 10 makes achieving high inter-component clinching strength compared to adhesives or like fixing means possible, enabling more solid anchoring. Because the axial dimension of the counter-plate 14 can therefore be designed thinner, the overall thickness of the spindle motor can be made that much more smaller-scale/lower-profile.

A further advantage to utilizing laser welding is that stabilized clinching strength can be obtained even with the bearing housing 10 and the counterplate 14 being formed from component materials that differ in thermal expansion coefficient. Likewise, directing the laser beam onto the abutment 40 to weld it circumferentially contributes to preventing the oil from scattering from the abutment 40.

An additional aspect of the motor assembly is a recessed portion 10d of the bearing housing 10, formed along the lower portion of the cylindrical inner surface of the bearing housing 10, sunken radially outward from the cylindrical inner surface along the lower portion. The recessed portion 10d radially opposes the thrust plate 22. Warpage produced during the laser welding operation is absorbed by the recessed portion 10d, thereby preventing the cylindrical inner surface in the lower marginal portion of the bearing housing 10 from, on account of the laser welding operation, deforming under the welding heat and coming into abutment with the outer periphery of the thrust plate 22. The resulting benefit is that efficiency in the manufacturing step of joining the bearing housing 10 and the counterplate 14 is improved.

It should be noted that because concomitant with welding is the application of high-temperature energy, argon gas, which is a cooling fluid, is supplied to the welded region as a means of cooling it during the welding operation. The cooling fluid is a substance whose reactivity with the metal surfaces of the counterplate 14, etc. is low, and desirably is in gaseous form. High-cooling-efficiency gases such as helium or nitrogen can be employed as the cooling fluid. It should also be noted that although in the laser welding operation described above the rotor hub 18 is rotated, alternatively the weld may be made by rotating the irradiation window 50 circumferentially along the abutment 40.

Next, via the capillary seal 34, oil is charged into the series of micro-gaps that constitute the bearing sections. Then the bracket 2 into which the stator 8 has been anchored is fixed to the bearing housing 10.

Figure 5:
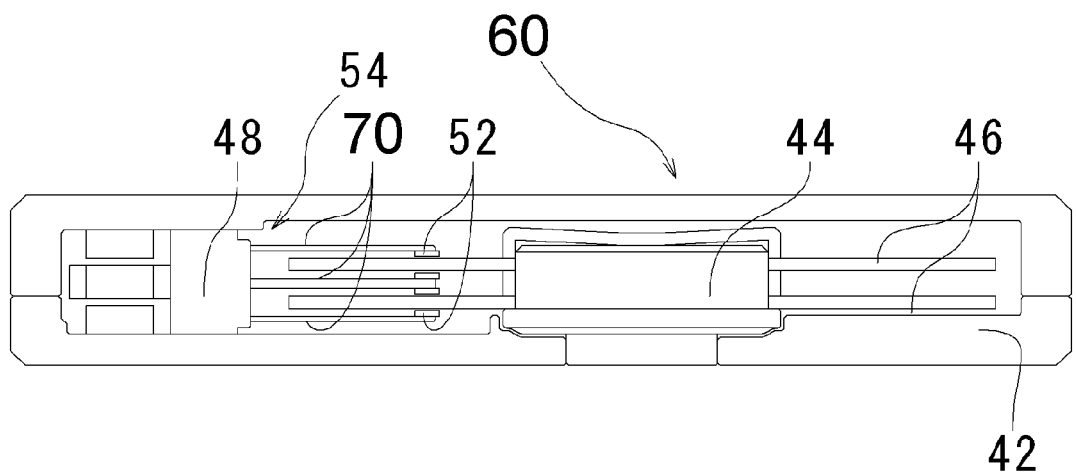
FIG. 5 is a vertical sectional view illustrating a recording-disk drive in the present invention.

Referring to FIG. 5, an explanation of the internal configuration of a general hard-disk drive 60 will next be made.

The hard-disk drive 60 comprises an oblong housing 42, and a clean space where dust and debris are extremely slight is formed inside the housing 42, in the interior of which is installed a spindle motor 44 on which platter-shaped hard disks 46 for recording information are fitted.

In addition, a head-shifting mechanism 54 that reads information from and writes information onto the hard disks 46 is disposed within the housing 42. The head-shifting mechanism 54 is constituted by: magnetic heads 52 that read/write information on the hard disks 46; arms 70 that support the magnetic heads 52; and an actuator 48 that shifts the magnetic heads 52 and arms 70 over the requisite locations on the hard disks 46.

Application of the spindle motor diagrammatically represented in FIGS. 1 through 4 as the spindle motor 44 for the hard-disk drive 60 just described, insofar as satisfactory functionality is ensured, contributes to the realization of a miniaturized, flattened disk drive, and allows high-dependability, high-endurance hard-disk drives to be made available.

Although in the foregoing explanation has been made of single embodiments of a spindle motor, a method of manufacturing a rotor for application in the spindle motor, and a hard-disk drive furnished with the spindle motor, the present invention is not limited to the given embodiments; various alterations and modifications are possible without departing from the scope of the invention.

For example, not being limited to the construction of dynamic pressure bearing of the illustrated embodiments, the geometry, and the number and location, of the grooves, and further, the type of lubricating fluid may differ from those of the embodiments set forth above. In addition, the bracket for the spindle motor and the housing for the hard-disk drive may be formed unitarily.

What is claimed is:

1. A fluid-dynamic-pressure bearing comprising:
   a shaft;
   a top plate fixed to an upper portion of the shaft;
   a thrust plate fixed to a bottom portion of the shaft;
   a circular cylindrical sleeve, either said sleeve or said shaft being rotatable relative to the other, said sleeve with respect to said shaft and with respect to said top plate defining a continuous micro-gap;
   a roughly cuplike bearing housing inner-circumferentially retaining the sleeve and whose lower end is closed;
   lubricating fluid filling the micro-gap;
   a radial bearing component formed in between respective surfaces of said shaft outer-circumferentially and said sleeve inner-circumferentially, said radial bearing component being provided with radial dynamic-pressure-generating grooves for inducing dynamic pressure in said lubricating fluid when either said shaft or said sleeve spins;
   an upper thrust bearing section formed in between respective surfaces of said top plate bottom-wise and said bearing housing rim-wise, said upper thrust bearing section being provided with upper thrust dynamic-pressure-generating grooves for inducing dynamic pressure in said lubricating fluid when either said shaft or said sleeve spins; and
   a lower thrust bearing section formed in between respective surfaces of said sleeve bottom-marginally and said thrust plate top-marginally, said lower thrust bearing section being provided with lower thrust dynamic-pressure-generating grooves for inducing dynamic pressure in said lubricating fluid when either said shaft or said sleeve spins.

2. A fluid-dynamic-pressure bearing as set forth in claim 1, wherein in between respective surfaces of said sleeve outer-circumferentially and said bearing housing inner-circumferentially, a communicating pathway is formed so that where one end of said pathway opens is radially inward from the upper thrust bearing section, and so as to communicate with the lower thrust bearing section nearby its outer periphery.

3. A fluid-dynamic-pressure bearing as set forth in claim 2, wherein said communicating pathway is constituted by an axial groove formed in the outer circumferential surface of said sleeve, and by the inner circumferential surface of said bearing housing.

4. A fluid-dynamic-pressure bearing as set forth in claim 2, wherein:
   said radial bearing component is configured by an axially separated pair of radial bearing sections formed in between the outer circumferential surface of said shaft and the inner circumferential surface of said sleeve, and in at least one of said pair of radial bearing sections axially imbalanced herringbone striations for inducing axially upward-to-downward-acting dynamic pressure in said lubricating fluid when either said shaft or said sleeve spins are provided as said dynamic-pressure-generating grooves; and
   in said upper thrust bearing section and in said lower thrust bearing section spiral striations for inducing radially inward-heading dynamic pressure in said lubricating fluid when either said shaft or said sleeve spins are respectively provided as said upper thrust and said lower thrust dynamic-pressure-generating grooves.

5. A fluid-dynamic-pressure bearing as set forth in claim 4, wherein:
   a circumventive projection is formed on said top plate, said circumventive projection extending axially downward from said top plate and radially opposing via a clearance said bearing housing along its outer circumferential surface;
   heading axially downward, from said top plate, along the clearance the radial dimension of the clearance widens; and
   oil as said lubricating fluid is retained in the clearance, the oil forming an air-liquid interface within the clearance.

6. A fluid-dynamic-pressure bearing as set forth in claim 5, wherein said sleeve is formed from a porous, oil-impregnated sintered metal.

7. A fluid-dynamic-pressure bearing as set forth in claim 6, wherein the roughness of the outer circumferential surface of said shaft is 0.1 µm or more but 1.6 µm or less Ra.

8. A fluid-dynamic-pressure bearing as set forth in claim 6, wherein the roughness of the outer circumferential surface of said shaft is from 0.3 µm to 0.8 µmRa.

9. A fluid-dynamic-pressure bearing as set forth in claim 6, wherein:
   said sleeve is fixed by means of an adhesive to the inner circumferential surface of said bearing housing;

an adhesive groove indented radially into either the outer circumferential surface of the sleeve or the inner circumferential surface of the bearing housing, or into both, is formed where said sleeve and said bearing housing abut on each other;

said adhesive is retained in said adhesive groove.

10. A fluid-dynamic-pressure bearing as set forth in claim 6, wherein:

said bearing housing comprises a circular cylindrical member having an inner circumferential portion for retaining said sleeve, and a counterplate closing over the lower end of said cylindrical member; and said counterplate and said cylindrical member are fixed to each other by welding.

11. A fluid-dynamic-pressure bearing as set forth in claim 10, wherein:

the locus in which said counterplate and said cylindrical member are welded together is situated radially outward from the inner circumferential portion of said cylindrical member; and along the inner circumferential portion of said cylindrical member, a recess is formed radially opposing said thrust plate along its outer periphery, for absorbing deformation of said cylindrical member due to the welding.

12. A fluid-dynamic-pressure bearing as set forth in claim 6, wherein said shaft and said top plate are formed integrally.

13. A spindle motor comprising:

a shaft;

a top plate fixed to an upper portion of the shaft;

a thrust plate fixed to a bottom portion of the shaft;

a circular cylindrical sleeve, either said sleeve or said shaft being rotatable relative to the other, said sleeve with respect to said shaft and with respect to said top plate defining continuous micro-gap;

a roughly cuplike bearing housing inner-circumferentially retaining the sleeve and whose lower end is closed;

a bracket having a portion whose inner periphery is for supporting said bearing housing;

a stator anchored to said bracket;

a magnet retained by said top plate, for generating a rotating magnetic field by interacting with said stator a dynamic-pressure bearing configured along said microgap, for supporting either said sleeve or said shaft rotatably relative to the other;

said dynamic-pressure bearing including lubricating fluid filling the micro-gap;

a radial bearing component formed in between respective surfaces of said shaft outer-circumferentially and said sleeve inner-circumferentially, said radial bearing component being provided with radial dynamic-pressure-generating grooves for inducing dynamic pressure in said lubricating fluid when either said shaft or said sleeve spins;

an upper thrust bearing section formed in between respective surfaces of said top plate bottom-wise and said bearing housing rim-wise, said upper thrust bearing section being provided with upper thrust dynamic-pressure-generating grooves for inducing dynamic pressure in said lubricating fluid when either said shaft or said sleeve spins; and a lower thrust bearing section formed in between respective surfaces of said sleeve bottom-marginally and said thrust plate top-marginally, said lower thrust bearing section being provided with lower thrust dynamic-pressure-generating grooves for inducing dynamic pressure in said lubricating fluid when either said shaft or said sleeve spins.

14. A spindle motor as set forth in claim 13, wherein in between respective surfaces of said sleeve outer-circumferentially and said bearing housing inner-circumferentially, a communicating pathway is formed so that where one end of said pathway opens is radially inward from the upper thrust bearing section, and so as to communicate with the lower thrust bearing section nearby its outer periphery.

15. A spindle motor as set forth in claim 14, wherein said communicating pathway is constituted by an axial groove formed in the outer circumferential surface of said sleeve, and by the inner circumferential surface of said bearing housing.

16. A spindle motor as set forth in claim 14, wherein:

said radial bearing component is configured by an axially separated pair of radial bearing sections formed in between the outer circumferential surface of said shaft and the inner circumferential surface of said sleeve, and in at least one of said pair of radial bearing sections axially imbalanced herringbone striations for inducing axially upward-to-downward-acting dynamic pressure in said lubricating fluid when either said shaft or said sleeve spins are provided as said dynamic-pressure-generating grooves; and in said upper thrust bearing section and in said lower thrust bearing section spiral striations for inducing radially inward-heading dynamic pressure in said lubricating fluid when either said shaft or said sleeve spins are respectively provided as said upper thrust and said lower thrust dynamic-pressure-generating grooves.

17. A spindle motor as set forth in claim 16, wherein:

a circumventive projection is formed on said top plate, said circumventive projection extending axially downward from said top plate and radially opposing via a clearance said bearing housing along its outer circumferential surface;

heading axially downward, from said top plate, along the clearance the radial dimension of the clearance widens; and oil as said lubricating fluid is retained in the clearance, the oil forming an air-liquid interface within the clearance.

18. A spindle motor as set forth in claim 17, wherein said sleeve is formed from a porous, oil-impregnated sintered metal.

19. A spindle motor as set forth in claim 18, wherein the roughness of the outer circumferential surface of said shaft is 0.1 µm or more but 1.6 µm or less Ra.

20. A spindle motor as set forth in claim 18, wherein the roughness of the outer circumferential surface of said shaft is from 0.3 µm to 0.8 µm Ra.

21. A spindle motor as set forth in claim 18, wherein:

said sleeve is fixed by means of an adhesive to the inner circumferential surface of said bearing housing;

an adhesive groove indented radially into either the outer circumferential surface of the sleeve or the inner circumferential surface of the bearing housing, or into both, is formed where said sleeve and said bearing housing abut on each other;

said adhesive is retained in said adhesive groove.

22. A spindle motor as set forth in claim 18, wherein:

said bearing housing comprises a circular cylindrical member having an inner circumferential portion for retaining said sleeve, and a counterplate closing over the lower end of said cylindrical member; and said counterplate and said cylindrical member are fixed to each other by welding.

23. A spindle motor as set forth in claim 22, wherein:
the locus in which said counterplate and said cylindrical member are welded together is situated radially outward from the inner circumferential portion of said cylindrical member; and
along the inner circumferential portion of said cylindrical member, a recess is formed radially opposing said thrust plate along its outer periphery, for absorbing deformation of said cylindrical member due to the welding.

24. A spindle motor as set forth in claim 18, wherein said shaft and said top plate are formed integrally.

25. A method of manufacturing a rotor assembly for a spindle motor outer peripherally on which at least one recording disk is retained, the rotor assembly including
a shaft defining a cylindrical outer surface,
a top plate having a circular platelike top-wall portion defining an undersurface and formed unitarily with an upper portion of said shaft, a cylindrical wall portion defining cylindrical inner and outer surfaces and depending from said top-wall portion outer-perimetrically, and a flange portion extending radially outward from said cylindrical wall portion, for carrying at least one hard disk,
a yoke made of a ferromagnetic material, the yoke fastened to either of respective inner and outer circumferential surfaces of the cylindrical wall portion, with a magnet fixed correspondingly to either of respective inner and outer circumferential surfaces of the yoke, wherein
the manufacturing method comprises:
a step of casting said top plate by a plastic formation process;
a step of fixing the magnet by means of an adhesive to one of either the inner or outer circumferential surfaces of the yoke; and
a step of carrying out a milling operation on the cylindrical outer surface of the shaft, on the undersurface of the top-wall portion of the top plate, on either the cylindrical inner or outer surface of the cylindrical wall portion, and on the recording-disk-carrying surface of the flange portion.

26. A rotor assembly manufacturing method as set forth in claim 25, wherein the top plate is cast by a forging operation.

27. A rotor assembly manufacturing method as set forth in claim 25, wherein the top plate is cast from aluminum or an aluminum alloy.

28. A recording-disk drive, on which at least one circular platelike recording medium on which information is recordable is mounted, and including a housing, a spindle motor anchored inside the housing for rotating the recording medium, and means for in requisite positions writing information onto and reading information from said recording medium, wherein the spindle motor comprises:
a shaft;
a top plate fixed to an upper portion of the shaft;
a thrust plate fixed to a bottom portion of the shaft;
a circular cylindrical sleeve, either said sleeve or said shaft being rotatable relative to the other, said sleeve with respect to said shaft and with respect to said top plate defining continuous micro-gap;
a roughly cuplike bearing housing inner-circumferentially retaining the sleeve and whose lower end is closed;
a bracket having a portion whose inner periphery is for supporting said bearing housing;
a stator anchored to said bracket;
a magnet retained by said top plate, for generating a rotating magnetic field by interacting with said stator a dynamic-pressure bearing configured along said micro-gap, for supporting either said sleeve or said shaft rotatably relative to the other;
said dynamic-pressure bearing including lubricating fluid filling the micro-gap;
a radial bearing component formed in between respective surfaces of said shaft outer-circumferentially and said sleeve inner-circumferentially, said radial bearing component being provided with radial dynamic-pressure-generating grooves for inducing dynamic pressure in said lubricating fluid when either said shaft or said sleeve spins;
an upper thrust bearing section formed in between respective surfaces of said top plate bottom-wise and said bearing housing rim-wise, said upper thrust bearing section being provided with upper thrust dynamic-pressure-generating grooves for inducing dynamic pressure in said lubricating fluid when either said shaft or said sleeve spins; and
a lower thrust bearing section formed in between respective surfaces of said sleeve bottom-marginally and said thrust plate top-marginally, said lower thrust bearing section being provided with lower thrust dynamic-pressure-generating grooves for inducing dynamic pressure in said lubricating fluid when either said shaft or said sleeve spins.

29. A recording-disk drive as set forth in claim 28, wherein in between respective surfaces of said sleeve outer-circumferentially and said bearing housing inner-circumferentially, a communicating pathway is formed so that where one end of said pathway opens is radially inward from the upper thrust bearing section, and so as to communicate with the lower thrust bearing section nearby its outer periphery.

30. A recording-disk drive as set forth in claim 29, wherein said communicating pathway is constituted by an axial groove formed in the outer circumferential surface of said sleeve, and by the inner circumferential surface of said bearing housing.

31. A recording-disk drive as set forth in claim 29, wherein:
said radial bearing component is configured by an axially separated pair of radial bearing sections formed in between the outer circumferential surface of said shaft and the inner circumferential surface of said sleeve, and in at least one of said pair of radial bearing sections axially imbalanced herringbone striations for inducing axially upward-to-downward-acting dynamic pressure in said lubricating fluid when either said shaft or said sleeve spins are provided as said dynamic-pressure-generating grooves; and
in said upper thrust bearing section and in said lower thrust bearing section spiral striations for inducing radially inward-heading dynamic pressure in said lubricating fluid when either said shaft or said sleeve spins are respectively provided as said upper thrust and said lower thrust dynamic-pressure-generating grooves.

32. A recording-disk drive as set forth in claim 31, wherein:
a circumventive projection is formed on said top plate, said circumventive projection extending axially downward from said top plate and radially opposing via a clearance said bearing housing along its outer circumferential surface;

heading axially downward, from said top plate, along the clearance the radial dimension of the clearance widens; and oil as said lubricating fluid is retained in the clearance, the oil forming an air-liquid interface within the clearance.

33. A recording-disk drive as set forth in claim 32, wherein said sleeve is formed from a porous, oil-impregnated sintered metal.

* * * * *